Patented Aug. 5, 1941

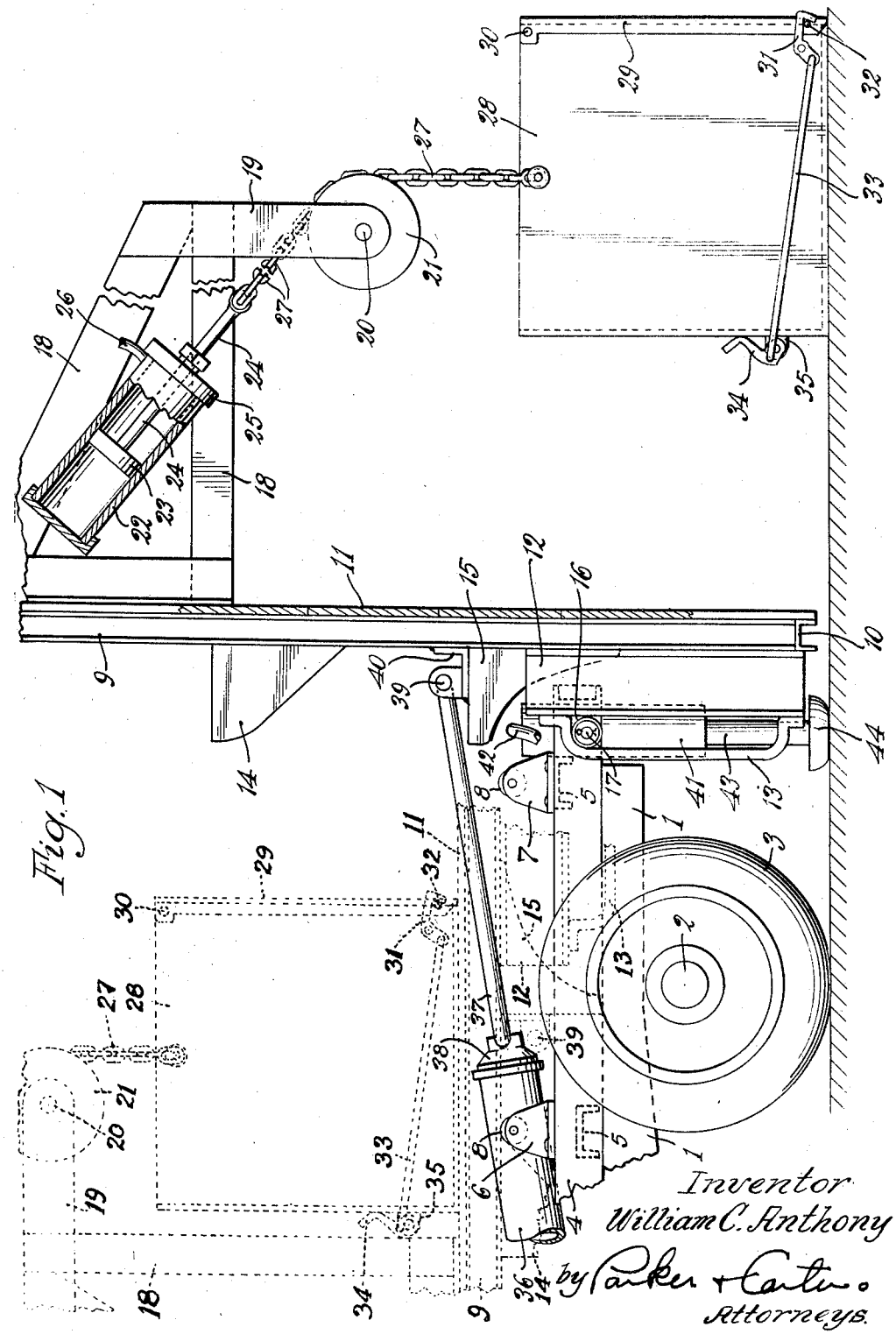

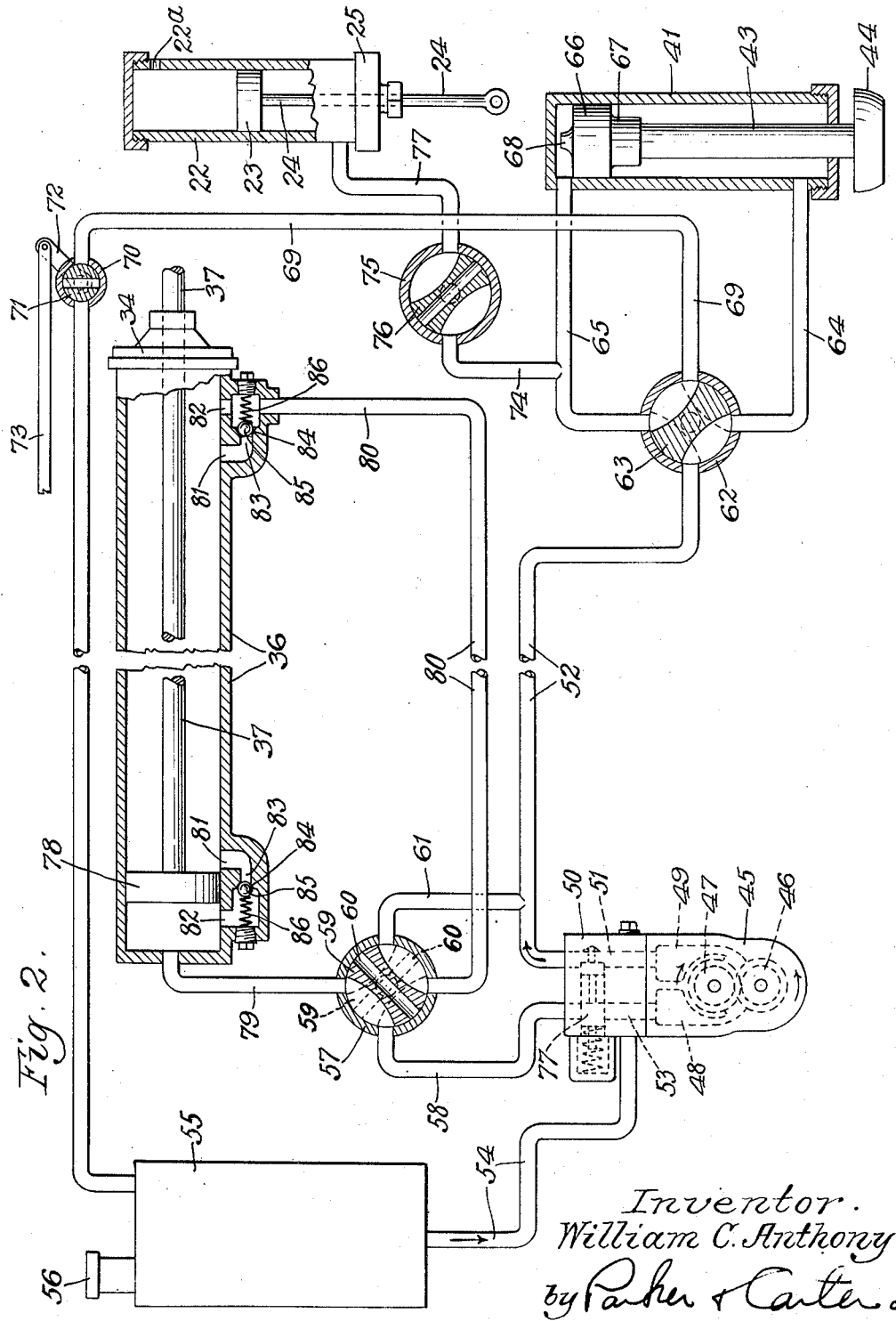

2,251,435

UNITED STATES PATENT OFFICE 2,251,435

TIPPING VEHICLE

William C. Anthony, Streator, Ill., assignor to Anthony Company, Streator, Ill., a corporation of Illinois Application August 18, 1939, Serial No. 290,765

13 Claims. (Cl. 214—77)

This invention relates to a receptacle and to a conveying means. In the particular form here shown it is embodied in or associated with a dumping mechanism mounted on a vehicle. It might be associated with another mechanism and is not limtied to the particular association here shown.

One object is to provide means in connection with a tipping platform or receptacle for raising and lowering a second receptacle. Where the invention is applied to a platform there is but one receptacle.

Another object is to provide means associated with a tipping platform, said means comprising a crane.

Another object is to provide in connection with a tipping member a crane and a receptacle supported thereby and a means for moving the receptacle with respect to the crane.

Other objects will appear from time to time in the course of the specification and claims.

The invention is illustrated more or less diagrammatically in the accompanying drawings, wherein:

Figure 1 is a side elevation with parts in section, parts omitted and parts broken away showing the invention applied to a tipping platform which is mounted on a truck;

Figure 2 is a schematic diagram of a hydraulic circuit suitable for the actuation of the mechanism shown in Figure 1.

Only so much of the truck is shown as to illustrate the association of the body and associate parts with the truck.

1 is a truck frame. An axle 2 carries wheels 3. Forward wheels are provided, an engine and other parts are also provided. They are not illustrated as their details form no essential part of the present invention.

The body mechanism may be mounted as here shown on a sub-frame 4 which is itself mounted on the vehicle frame 1. The sub-frame comprises longitudinal members and may have transverse members 5. Mounted preferably on the side frame members 4, are two roller supports 6 and 7, in each of which is journaled a roller 8. There are preferably two such rollers on each side of the truck.

The tipping body or platform carries a frame 9, which will include the rotatable members shown and one or more transverse members 10 and a platform 11 which serves as a base for the support of articles which may be put upon it. Extending downwardly from each of the side members 9, preferably adjacent its rear, is a track and supporting member 12 to which is secured an outwardly positioned retaining member 13.

Secured also to each of the side frame members 9 are cams 14 and 15 adapted to contact the rollers 8. A roller 16 mounted on a pin or shaft 17 is thus journaled in each of the sub-frame side members 4.

Mounted also on the tipping platform is a crane structure which comprises mast members 18, 18 and one or more additional outwardly extending boom members 19. Adjacent the frame ends of the members 19 and mounted upon a shaft 20 is a sheave 21. A hydraulic cylinder 22 having an opening 22a to the atmosphere is supported upon the crane and contains a piston 23 from which a piston rod 24 projects outwardly through the cylinder head 25. Pressure fluid is supplied to the cylinder 22 through a pipe or conduit 26. A chain or other suitable member 27 is secured at one end to the outer end of the piston rod 24 and at its other end is secured to a bucket 28. It is to be understood that there may be two cylinders, two chains and two sheaves or there may be only one. The chain or other flexible member 27 might also be secured directly to the bucket 28 or to a bail mounted on the bucket. The bucket itself, as shown, is a general rectangle in cross section. It has a gate 29 pivoted upon it as at 30. A latch 31 engages a pin 32 on the bucket gate, a connecting rod 33 is secured at one end to the latch 31 and at the other end to the tipping member 34, which is itself rotatably mounted on a supporting member 35. The centers of these parts are so arranged that a toggle-like effect or over-center lock is produced and when the door 29 is closed it tends to remain closed because of this toggle-like relation.

While the platform may be tilted with relation to the body or truck by any means, the hydraulic means shown is convenient. As shown, it comprises a cylinder 36 which contains a piston, not shown, but from which a piston rod 37 extends outwardly through a cylinder head 38. The outer end of the piston rod is rotatably mounted as at 39 on a member 40 which may be secured to the side frames 9 of the tilting platform, or anywhere else upon the tilting platform. Sometimes it is desirable to provide an auxiliary support for the rear of the vehicle or truck so that when the platform and associated parts are tipped and their weight is correspondingly transferred to the rear, means are provided for under balancing this effect. As shown, this means comprises a hydraulic cylinder 41 to which pressure fluid is supplied through a tube or pipe 42. A piston, not shown, is mounted for movement in the cylinder. A piston rod 43, extends outwardly from the piston and carries at its outer end a foot 44.

The schematic diagram of Figure 2 illustrates a suitable hydraulic connection of the parts shown in Figure 1, although the parts might have been actuated by different hydraulic mechanisms and controls.

In general, the mechanism comprises means for connecting, actuating and controlling the pistons in the cylinders 22, 36 and 41 of Figure 1. The mechanism shown in Figure 2 comprises a pump 45, which may be of the rotary type having rotors 46 and 47, an inlet passage 48 and an outlet passage 49. It is convenient to make a pump housing in one piece and to associate with it a control housing or block 50 within which is formed a high pressure passage 51 which communicates with the chamber 49 and from which a high pressure pipe or duct 52 leads outwardly. On the inlet side, a passage 53, which communicates with the inlet passage 48 of the pump housing, is formed in the block 50. Communicating with it is a pipe or duct 54 which leads from a sump 55 which may have a filling opening 56. A main control valve housing 57 is connected to the pump through an inlet pipe 58. A valve member 59 is positioned within the housing and has a passage 60 formed in it. A pipe 61 leads from the high pressure pipe 52 to the valve housing 57. The pipe 52 carries high pressure fluid to a valve housing 62 within which is positioned a valve 63. From one side of the valve housing 62 a pipe 64 communicates with the lower end of the cylinder 41. From the opposite side of the housing 62, a pipe 65 communicates with the upper end of the cylinder 41. A piston 66 is mounted on the piston rod 43 within the cylinder 41. It carries, preferably at its lower side, an enlargement 67 which serves as a stop to limit its downward movement, and at its upper side, a stop 68 which limits its upward movement. From the valve housing 62, a return pipe 69 leads back to the sump 55. A valve housing 70 may be positioned in the return line 69. A valve 71 is positioned in it. This valve is controlled by means of a lever 72 and a connecting rod 73 which leads to any suitable point from which it may be moved as desired. A pipe 74 is connected to the pipe 65. It leads to a valve housing 75 within which a valve 76 is movably mounted. From this housing, a pressure pipe 77 leads o the cylinder 22.

Within the main hoisting cylinder 36 and secured to the piston rod 37 is a piston 78. In the particular form here shown, the hoisting cylinder is arranged both to raise and lower positively by means of pressure fluid. To accomplish this, a pipe or conduit 79 leads from the valve housing 57 to the lefthand end of the cylinder 36. A second pipe 80 leads from the valve housing 57 to the opposite or righthand end of the cylinder 36. The connections of the pipes 79 and 80 to the cylinder may be of many types. As shown, the cylinder itself is arranged with bypass means which include ducts 81, 81 positioned away from the ends of the cylinder, and additional or second ducts 82, 82, one positioned between each of the ducts 81 and the adjacent end of the cylinder. A passage or duct 83 leads from each of the ducts 81 toward a ball seat 84 upon each of which ball check valves 85 are seated by springs 86. The effect of this mechanism is to prevent damage to the parts and overrunning of the piston. When the piston has been moved to the position of Figure 2, further pressure fluid entering at the righthand end of the cylinder will pass through the righthand duct 82 and thence through the lefthand duct 81. This is made possible because the piston has moved to the left sufficiently to uncover that duct. The pressure fluid, thus, unseats the lefthand ball check valve 85 and passes outward through the pipe 79 through the valve housing 57, the pipe 58 and back to the intake side of the pump assembly. The parts are shown in the lowered position, and this arrangement permits continued running of the pump, if desired, and circulating of the fluid without moving the piston 78. Similarly, if the piston were in the full righthand or raised position, pressure fluid could circulate and would hold the piston stationary and in the raised position.

A check mechanism is indicated generally at 77. It is not described in detail as the invention is not limited to its use, and it forms no essential part of the mechanism or invention herewith disclosed. It serves to prevent overrunning of the receptacle in the tipping movement but the apparatus may be used without it.

The valves 63 and 76 permit cutting the jack out of operation or the bucket-hoisting cylinder 22 out of operation. Where it is not desired to use them, one or the other, or both, of them may be cut out; or they may both be left in operation. If they are both in operation, when pressure is on the hoisting cylinder 36, they will operate to force the jack into ground-contacting position and to raise the bucket 28 either from the ground or from the vehicle body or platform. When pressure is released from the main hoisting cylinder, the bucket may be lowered.

Although there is shown an operative form of the device, it will be understood that many changes in the form, shape and arrangement of parts might be made without departing from the spirit of the invention; and it is wished that this showing be taken as, in a sense, diagrammatic.

The use and operation of this invention are as follows:

The device of this invention comprises a tipping platform and a crane and a bucket, as well as a vehicle or other support on which the platform may be mounted for movement, and an auxiliary support for the vehicle.

When the platform is tipped from the dotted line position to the full line position, the weight of the load is moved to the rear; and it may be desirable to provide a support in addition to the wheels which, as the weight moves to the rear, is moved to contact the ground and, thus, to furnish an auxiliary support.

As the platform tips, the bucket 28, which has rested on the platform, swings from it toward and finally into the full line position. The bucket might be attached to the crane by a chain of fixed length and it would swing clear of the platform during tipping. It is desirable ordinarily, however, to have additional means for causing some raising and lowering of the bucket with respect to the crane and, correspondingly, with respect to the platform 11. For that reason, the mechanism shown, including the chain 27, the sheave 21, the piston rod 24, the piston 23 and the cylinder 22, is used.

The hydraulic circuit is not indicated in detail as the invention is not limited to its details. It is sufficient to state that there is a source of pressure fluid—for example, a rotary or gear pump— and that conduits and pipes are provided for directing the fluid to the various cylinders and that valves are provided for controlling its flow to and from such cylinders. The assembly in the untipped position is shown in dotted lines. When it is desired to move it to the tipping position, the controls are operated to bring pressure fluid into the main or tipping cylinder 36, and the tipping platform with its associated parts is moved rearwardly and is tipped as the cams 12 and 14 ride up on the rollers 8. It is finally brought to the full vertical position shown in the figure.

When the tipping operation commences, pressure fluid is directed to the cylinder 41, the piston rod 43 is forced outwardly and the foot 44 contacts the ground. This, preferably, takes place before any substantial tipping has occurred.

At the same time that the previously described operations are taking place, fluid under pressure is forced into the cylinder 22, the piston is withdrawn in it somewhat and the bucket is raised somewhat so that it readily clears the surface of the tipping platform. When the parts reach the full line position, pressure in the cylinder 22 is reduced and the bucket is then lowered until it contacts the ground or whatever other surface is beneath it.

The return movement of the parts is generally the reverse of that described for tipping. The bucket is raised from the ground slightly, the tipping platform returns to the dotted line position and, finally, the foot 44 is withdrawn from the ground.

I claim:

1. In combination with a support, a load-carrying platform mounted thereon for tipping with relation thereto, hydraulic power means, including a cylinder, for tipping said platform, a crane mechanism mounted upon said platform and including a load-supporting structure additional to said platform and a hydraulic cylinder and piston supported from said platform, and a bucket supported from said crane, supporting means extending from said bucket to said last mentioned cylinder and connections between both cylinders whereby, when the tipping cylinder is actuated, both cylinders are actuated, the crane mechanism extending above the load carrying platform a distance such that when the platform is in the tipped position, the bucket hangs free, out of contact with the platform.

2. In combination with a support, a load-carrying platform mounted thereon for tipping with relation thereto, hydraulic power means, including a cylinder, for tipping said platform, a crane mechanism mounted upon and projecting above said platform and including a load-supporting structure and a hydraulic cylinder and piston supported from said platform, and a bucket supported from said crane, flexible supporting means extending from said bucket to said last mentioned cylinder and connections between both cylinders whereby, when the tipping cylinder is actuated, both cylinders are actuated.

3. In combination with a support, a load-carrying platform mounted thereon for tipping with relation thereto, hydraulic power means, including a cylinder, for tipping said platform, a crane mechanism mounted upon said platform and including a load-supporting structure and a hydraulic cylinder and piston supported from said platform, and a bucket supported from said crane, flexible supporting means extending from said bucket to said last mentioned cylinder and connections between both cylinders whereby, when the tipping cylinder is actuated, both cylinders are simultaneously actuated, the crane mechanism extending above the load carrying platform a distance such that when the platform is in the tipped position, the bucket hangs free, out of contact with the platform.

4. In combination with a support, a platform mounted thereon for tipping with relation thereto, hydraulic power means, including a cylinder, for tipping said platform, an auxiliary supporting member comprising a cylinder and a ground-contacting part, a crane mechanism mounted upon and moving with said platform and including a load-supporting structure and a hydraulic cylinder and piston supported from said platform and moving therewith, and a bucket supported from said crane, supporting means extending from said bucket to said last mentioned cylinder and connections between all the cylinders whereby, when the tipping cylinder is actuated, all cylinders are actuated.

5. In combination with a support, a platform mounted thereon for tipping with relation thereto, hydraulic power means, including a cylinder, for tipping said platform, an auxiliary supporting member comprising a cylinder and a ground-contacting part, a crane mechanism mounted upon said platform and including a load-supporting structure and a hydraulic cylinder and piston supported from said platform and moving therewith, and a bucket supported from said crane, flexible supporting means extending from said bucket to said last mentioned cylinder and connections between all the cylinders whereby, when the tipping cylinder is actuated, all cylinders are simultaneously actuated.

6. In combination with a support, a platform mounted thereon for tipping with relation thereto, means on said platform and said support adapted to cause lateral movement of the said platform upon the occurrence of tipping, hydraulic power means, including a cylinder, for tipping said platform, an auxiliary supporting member comprising a cylinder and a ground-contacting part, a crane mechanism mounted upon said platform and including a load-supporting structure and a hydraulic cylinder, and a bucket supported from said crane, flexible supporting means extending from said bucket to said last mentioned cylinder and connections between all the cylinders whereby, when the tipping cylinder is actuated, all cylinders are simultaneously actuated.

7. In combination with a vehicle body, a main structure, supporting wheels therefor, a platform movably mounted thereon, a hydraulic cylinder mounted on said structure and containing a piston, adapted, when actuated, to tip said platform with relation to said structure, a crane structure mounted on said platform, a load-carrying hydraulic cylinder, a piston therein and a piston rod extending outwardly from said load-carrying cylinder, a bucket, a supporting member connected to said piston rod and to said bucket, all cylinders being connected hydraulically so that upon the actuation of one all are actuated.

8. In combination with a vehicle body, a main structure, supporting wheels therefor, a platform movably mounted thereon, a hydraulic cylinder mounted on said structure and containing a piston, adapted, when actuated, to tip said platform with relation to said structure, a crane structure mounted on said platform, a load-carrying hydraulic cylinder mounted on said crane structure, a piston therein and a piston rod extending outwardly from said load-carrying cylinder, a bucket, a supporting member connected to said piston rod and to said bucket, all cylinders being connected hydraulically so that upon the actuation of one all are actuated.

9. In combination with a vehicle body, a main structure, supporting wheels therefor, a platform movably mounted thereon, a hydraulic cylinder mounted on said structure and containing a piston, adapted, when actuated, to tip said platform with relation to said structure, a crane structure mounted on said platform, a load-carrying hydraulic cylinder mounted on said crane structure, a piston therein and a piston rod extending outwardly from said load-carrying cylinder, a bucket, a flexible supporting member connected to said piston rod and to said bucket and extending about a portion of said crane structure, all cylinders being connected hydraulically so that upon the actuation of one all are actuated.

10. In combination with a vehicle body, a main structure, supporting wheels therefor, a platform movably mounted thereon, a hydraulic cylinder mounted on said structure and containing a piston, adapted, when actuated, to tip said platform with relation to said structure, a supporting cylinder mounted on said structure, a piston therein, a piston rod connected thereto and extending outwardly toward the ground, a crane structure mounted on said platform, a load-carrying hydraulic cylinder mounted on said crane structure, a piston therein and a piston rod extending outwardly from said load-carrying cylinder, a bucket, a flexible supporting member connected to said piston rod and to said bucket and extending about a portion of said crane structure, all cylinders being connected hydraulically so that upon the actuation of one all are actuated.

11. In combination with a vehicle body, a main structure, supporting wheels therefor, a load carrying platform pivoted thereon, means for rotating the platform about its pivot axis between generally horizontal and generally vertical positions, a crane including a mast extending upwardly from the platform, a boom extending laterally from the top of the mast in a direction generally parallel to the platform, a bucket, a flexible tension member interposed between the bucket and the crane for raising and lowering the bucket, the height of the mast being such that when the platform is in the vertical position the bucket hangs free out of contact with the platform.

12. In combination with a vehicle body, a main structure, supporting wheels therefor, a load carrying platform pivoted thereon, means for rotating the platform about its pivot axis between generally horizontal and generally vertical positions, a crane including a mast extending upwardly from the platform, a boom extending laterally from the top of the mast in a direction generally parallel to the platform, a bucket, a flexible tension member interposed between the bucket and the crane for raising and lowering the bucket, the height of the mast being such that when the platform is in the vertical position the bucket hangs free out of contact with the platform, the lateral extension of the boom being such that when the platform is in the horizontal position the bucket hangs free out of contact with the mast.

13. In combination with a vehicle body, a main structure, supporting wheels therefor, a load carrying platform pivoted thereon, means for rotating the platform about its pivot axis between generally horizontal and generally vertical positions, a crane including a mast extending upwardly from the platform, a boom extending laterally from the top of the mast in a direction generally parallel to the platform, a bucket, a flexible tension member interposed between the bucket and the crane for raising and lowering the bucket, the lateral extension of the boom being such that when the platform is in the horizontal position the bucket hangs free out of contact with the mast.

WILLIAM C. ANTHONY.